March 26, 1946.     M. G. CLAY     2,397,088
METHOD OF AND APPARATUS FOR CONTROLLING DIRECTIONAL CHANGES OF BOMBS
Filed Feb. 4, 1942     6 Sheets-Sheet 1
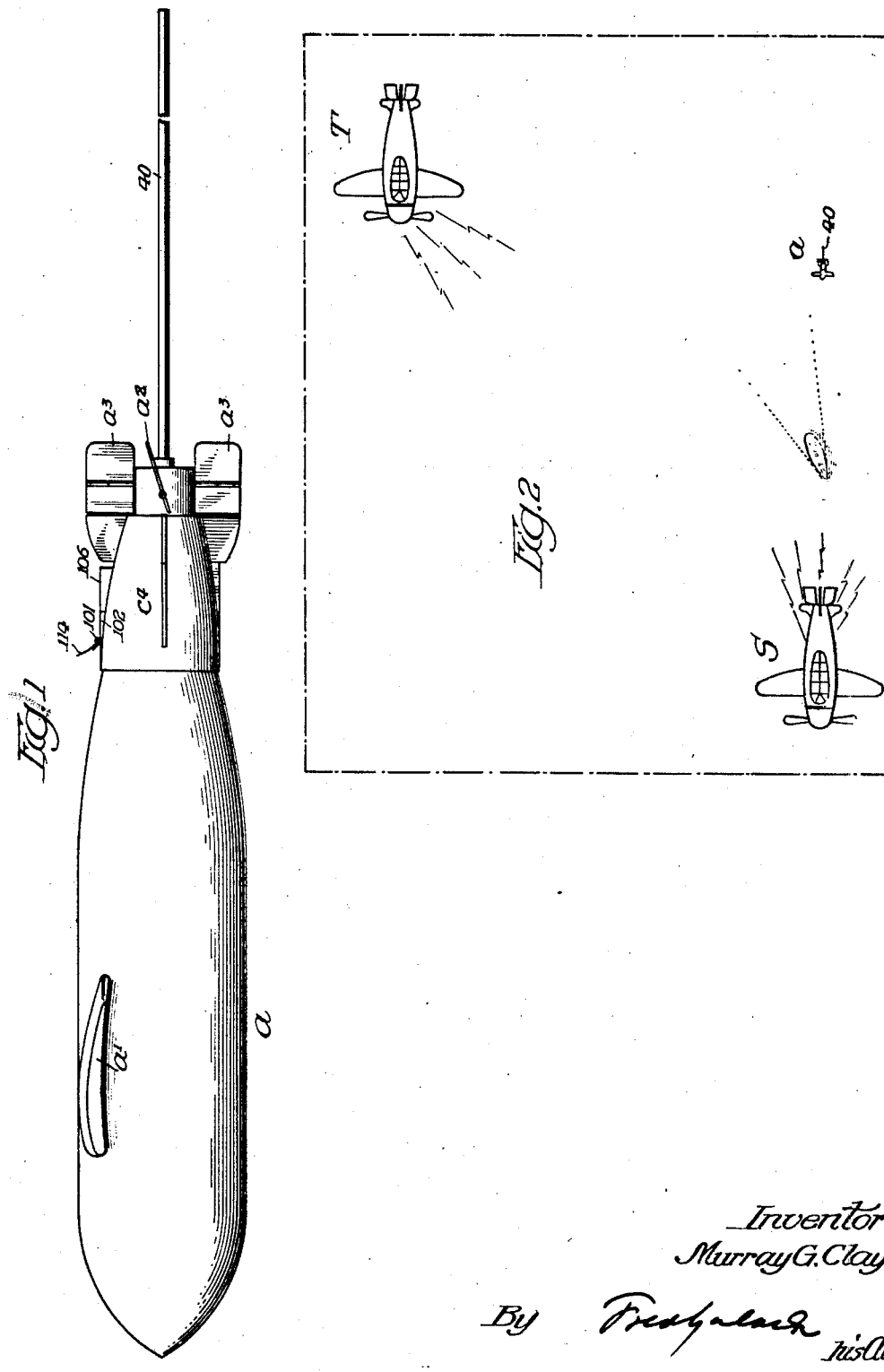
Inventor
Murray G. Clay
By [signature] his Atty.

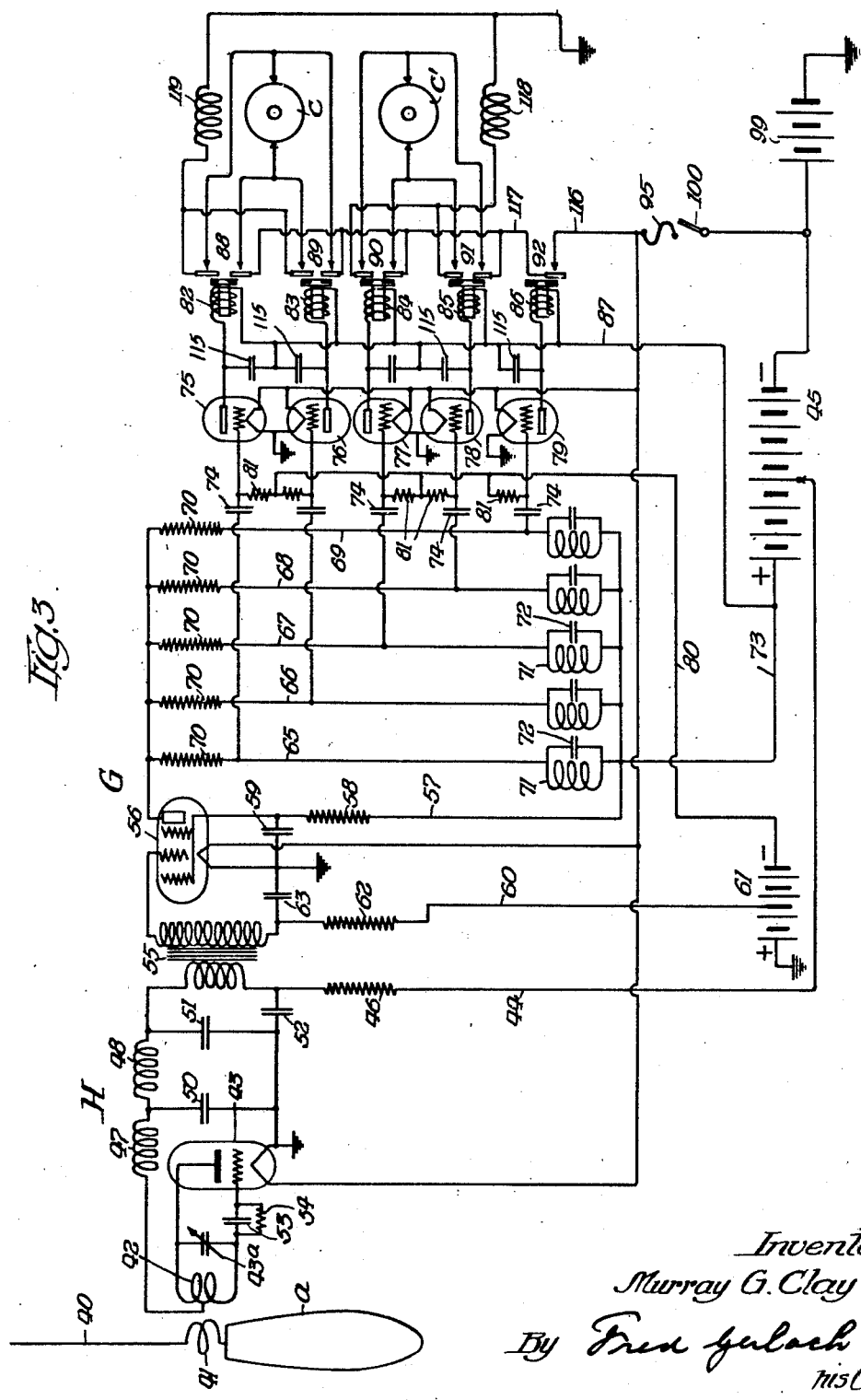

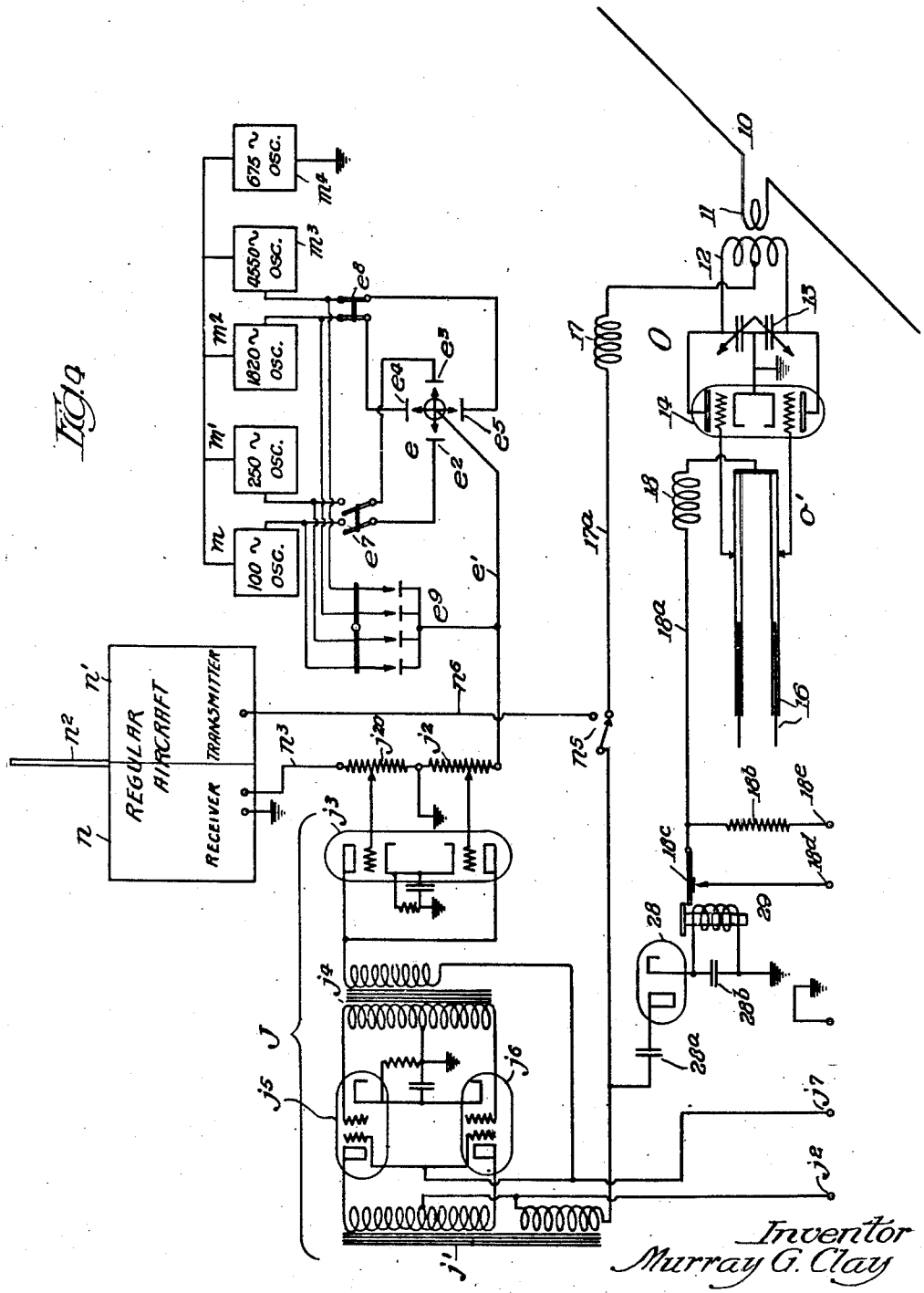

March 26, 1946.    M. G. CLAY    2,397,088
METHOD OF AND APPARATUS FOR CONTROLLING DIRECTIONAL CHANGES OF BOMBS
Filed Feb. 4, 1942    6 Sheets-Sheet 4
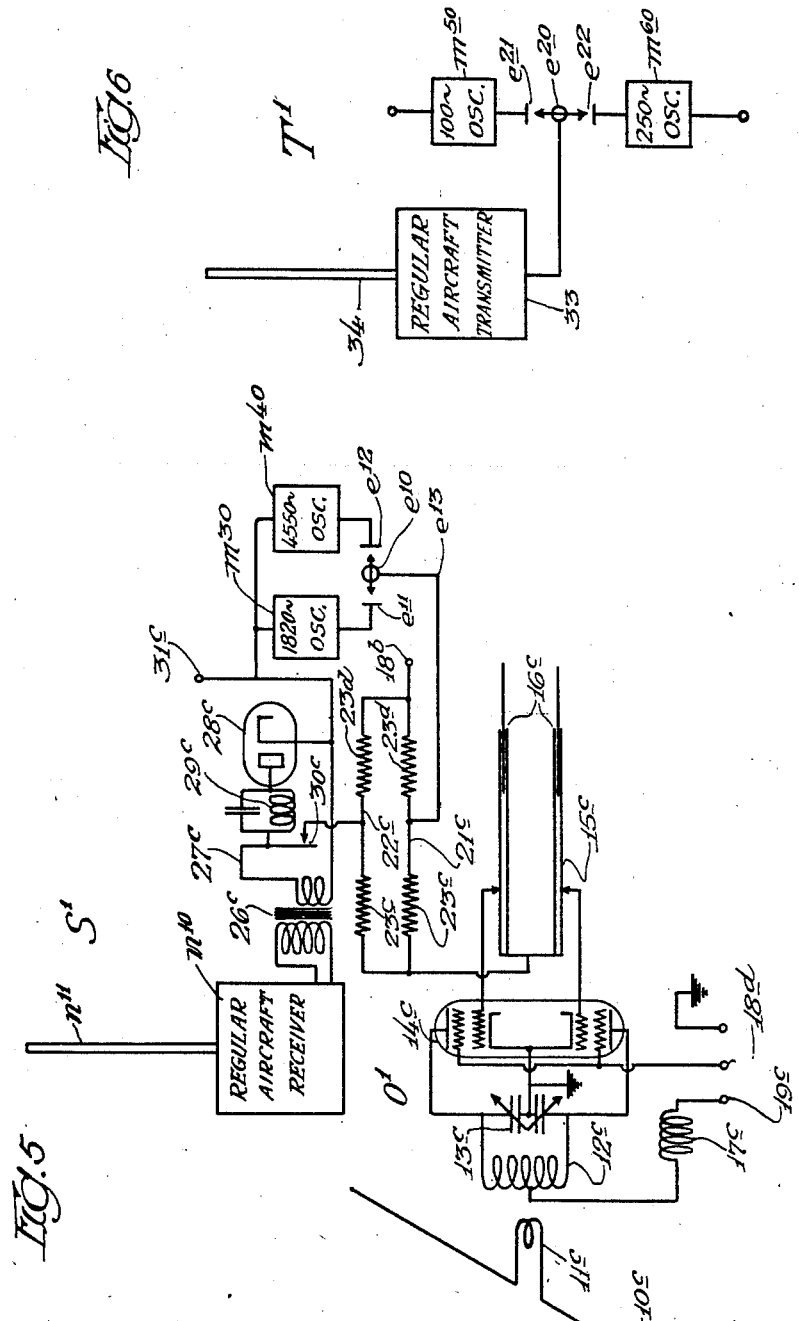

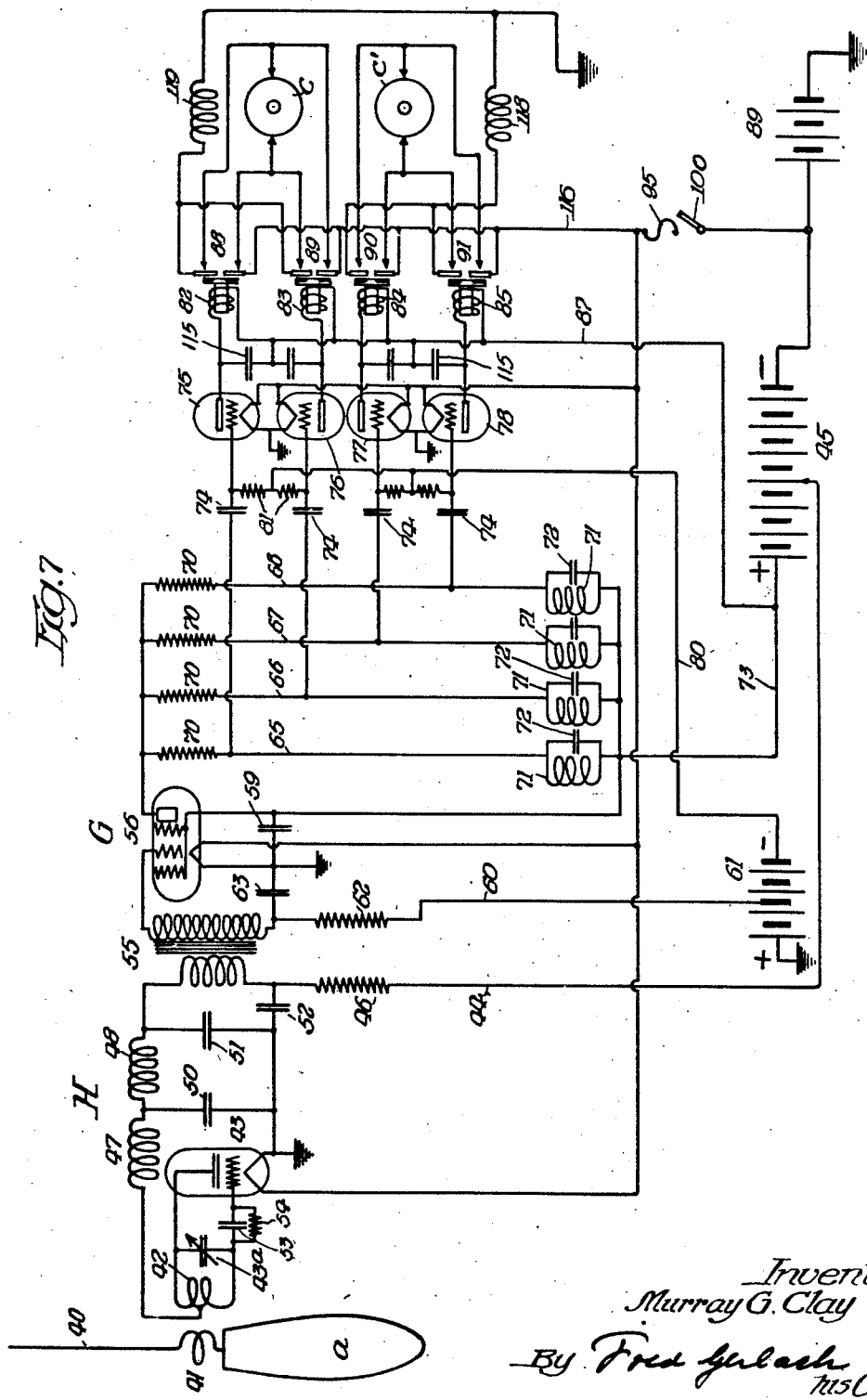

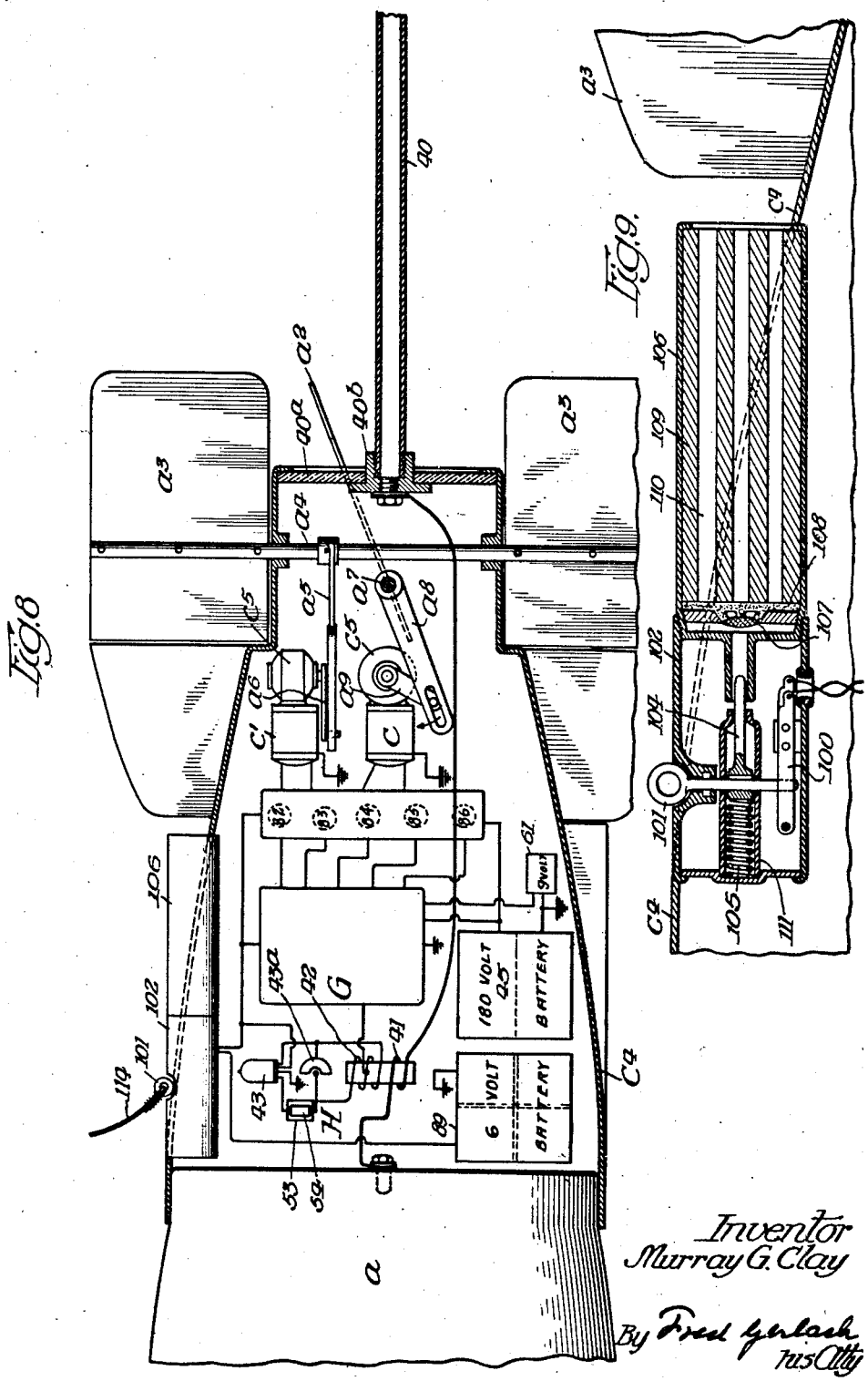

Patented Mar. 26, 1946

2,397,088

UNITED STATES PATENT OFFICE 2,397,088

METHOD OF AND APPARATUS FOR CONTROLLING DIRECTIONAL CHANGES IN BOMBS

Murray G. Clay, Chicago, Ill.

Application February 4, 1942, Serial No. 429,454

5 Claims. (Cl. 250—2)

The invention relates to aerial bombing.

One object of the invention is to provide a method and apparatus for directionally controlling bombs, while in flight, to the desired objective from aircraft.

Another object of the invention is to provide a method by which a discharged bomb can be steered for vertical and lateral variation in direction, by the coordination by operators in airplanes which are maneuvering in different courses, from which the lateral course and the trajectory can be observed.

Another object of the invention is to provide improved transmission for radio signals between aircraft and a discharged bomb for directionally controlling the path of the bomb during its flight.

Another object of the invention is to provide apparatus on the dirigible bomb which is responsive to a radio frequency modulated by different audio-frequencies for selectively steering the bomb in any direction, and is controllable from aircraft.

Another object of the invention is to provide improved apparatus on aircraft for controlling the steering means of a dirigible bomb for deflection of the bomb toward the desired objective.

Other objects will appear from the detailed description of the invention.

The invention consists in the several novel features hereinafter set forth and more particularly defined by claims at the conclusion hereof.

In the drawings:

Fig. 1 is a side elevation of a bomb embodying the radio controlled means for steering the bomb in flight.

Fig. 2 is a diagram illustrating the method of maneuvering two airplanes with respect to the discharged bomb and the objective for observation of its lateral course and trajectory.

Fig. 3 is a diagram of the equipment on the bomb for controlling the steering means.

Fig. 4 is a diagram of the equipment on the airplane for controlling the bomb equipment illustrated in Fig. 3.

Fig. 5 is a diagram of the equipment on one airplane for controlling only the signals for controlling the rudder on the bomb and also for transmitting signals which are received from a second airplane for controlling the elevator.

Fig. 6 is a diagram of the apparatus on an airplane which is used for controlling only the operation of the elevator on the bomb.

Fig. 7 is a diagram of the apparatus on a bomb for control by the apparatus illustrated in Figs. 5 and 6.

Fig. 8 is a view, partly in section, illustrating the apparatus carried in the housing attached to the rear end of the bomb, and the steering means for the bomb.

Fig. 9 is a section illustrating the switch carried by the bomb for connecting the battery for control of the steering means, and means for producing a visible indication of the path of travel of the bomb.

The bomb $a$ is equipped for directional control, after it has been discharged, with dihedral wings $a^1$; and steering means which comprises a two section elevator $a^2$ for modifying the range or vertical travel of the bomb; and a two section control surface or rudder $a^3$ for lateral deflection of the bomb; and electric motors $c$, $c^1$ for respectively shifting the elevator $a^2$ and rudder $a^3$. It is contemplated that the wings $a^1$ shall have sufficient area for maintaining lateral balance and directional control by the steering means. The steering means and motors $c$, $c^1$ are supported in a rearwardly tapered housing $c^4$, the front end of which is secured to the trailing end of the body of the bomb $a$. Each of the motors $c$, $c^1$ is connected to drive a speed reducer $c^5$. The two sections of rudder $a^3$ are fixed to a shaft $a^4$ which is journaled in the housing $c^4$ and is operable to swing the rudder laterally to the right or left from its neutral position by an arm $a^5$ which is fixed to said shaft, and a crank arm $a^6$ which is driven by the motor $c^1$ through its associated gear reducer $c^5$. The sections of elevator $a^2$ are connected by a shaft $a^7$ which is journaled in housing $c^4$ and is rotatable to shift the elevator to positive or negative angles by an arm $a^8$ which is fixed to said shaft, and a crank arm $a^9$ which is operable by motor $c$ through its associated reducer $c^5$. These motor-operable connections are adapted to hold the rudder and elevator in the positions to which they are shifted when the motor is stopped. The motors are reversible so that they are adapted to shift the rudder and elevator from and to their neutral positions under control of the apparatus hereinafter described.

The bomb $a$ is equipped (Fig. 3) with radio responsive apparatus H for receiving and detecting radio control signals from aircraft, and audio-responsive apparatus G which is selectively responsive to audio control signals from radio responsive apparatus H, for the purpose of controlling the operation of reversible electric motor $c$, which is adapted to shift the elevator $a^2$, and the reversible electric motor $c^1$, which is adapted to shift the rudder $a^3$. This apparatus is mounted in the housing $c^4$.

Apparatus H comprises a ½ wave-length dipole antenna which includes a coupling coil 41, the bomb body $a$ acting as one pole, and a copper tube 40 acting as the other pole. Tube 40 is coaxial with, or extends in a direction parallel to, the axis of, and rearwardly from, the bomb. This antenna is relatively insensitive to signals originating in the general direction of its axis, and highly sensitive to signals originating approximately at right angles to its axis. This renders the receiving apparatus H less responsive to signals originating near the objective, and intended to interfere with the control of the bomb. As the bomb approaches the objective, its axis will be directed toward any such interfering signal source so that the antenna will become less responsive to such interfering signals. By utilizing the body of the bomb as one pole of the dipole antenna the total length of the antenna will not be excessive while its high efficiency will be retained. The tube 40 is supported in a plate of insulation 40$^a$, and is screwed into metallic bushing 40$^b$ fixed in said plate, so the tube can be left unattached while the bomb is in storage or being transported, and attached when it is to be used. The apparatus H constitutes a superregenerative ultra high frequency radio receiver and comprises an antenna secondary coil 42, a superregenerative detector tube 43 (type 9002); a conductor 44 which is adapted to supply approximately 90 volt potential from a battery 45; a tuning condenser 43$^a$; an isolating resistor 46 of approximately 5000 ohms in the conductor 44, and a grounded filter condenser 52 for preventing audio signals from feeding back through the battery 45 to other circuits which are connected to said battery; condensers 50, 51, which, with the filament of tube 43 are connected to ground; choke-coils 47, 48, and filter condensers 50 and 51 which provide a low-pass filtering means for the purpose of transmitting the audio signals and filtering out the radio and super-sonic quench frequencies; a grid-condenser 53 of approximately 50 mmfd., and a resistor 54 of approximately 10 megohms are connected to the grid-circuit of radio tube 43 to provide the desired super-sonic quench frequency for superregenerative detector action; and the primary coil of an audio transformer 55. Audio responsive apparatus G includes the secondary of transformer 55, an audio-amplifier tube 56 (type 6SJ7), the screen-grid of which is connected to receive potential through a resistor 58, of approximately 1 megohm, from 180 volt battery 45; a condenser 59 and resistor 58 in the screen-grid circuit of radio tube 56; a connection for the control grid-circuit of radio tube 56 to receive potential through a resistor 62 of approximately $\frac{1}{10}$ megohm, which is connected by a conductor 60 to receive minus 1½ volt bias potential from battery 61. Resistor 62 and condenser 63 isolate the control grid-circuit of radio tube 56. One terminal of the filament of tube 56 and the condensers 59, 63 are connected to the ground. The plate of radio tube 56 is connected to a series of five parallel circuits, 65, 66, 67, 68 and 69, each of which includes a resistor 70 and a coil 71 and condenser 72 connected in parallel. Said parallel circuits are connected by a conductor 73 to receive 180 volt potential from battery 45. Each associated coil 71 and condenser 72 constitute a resonant circuit responsive to predetermined audio-frequencies. The coils and condensers in said resonant circuits are of relatively different values for responding to different frequencies. For example, the resonant elements in circuit 65 may be responsive to an audio-frequency of 100 cycles per second; in circuit 66 to 250 cycles per second; in circuit 67 to 1820 cycles per second; in circuit 68 to 4550 cycles per second; and in circuit 69 to 675 cycles per second. Said parallel circuits are used to selectively control radio tubes for selectively controlling a series of relays. Circuit 65 is coupled to the control grid of a radio tube 75; circuit 66 is coupled to the control grid of radio tube 76; circuit 67 is coupled to the grid of a radio tube 77; circuit 68 is coupled to the control grid of a radio tube 78; and circuit 69 is coupled to the control grid of a radio tube 79. Said tubes may be similar to type 6J5, but all tubes in the bomb are preferably equipped with quick heating filaments. The control grids of tubes 75, 76, 77, 78, and 79 are connected to resistors 81 of approximately 1 megohm, which receive 9 volt negative potential through conductor 80, from battery 61. The circuits 65, 66, 67, 68 and 69 are respectively coupled to the control grids of radio tubes 75, 76, 77, 78 and 79 by condensers 74 of approximately .01 mfd. value, to block 180 volt plate potential by battery 45 from said control grids.

The plate-circuits for radio tubes 75, 76, 77, 78 and 79 are coupled to the helices of relays 82, 83, 84, 85 and 86, respectively, which are connected to receive 180 volt potential from battery 45 via a conductor 87. Relay 82 is adapted to close a two-pole switch 88 which controls the operation, from 6 volt battery 99, of reversible motor $c$ in one direction for shifting elevator $a^2$ in one direction. Relay 83 is adapted to close a two-pole switch 89 for controlling the operation of motor $c$ in the reverse direction for reversely shifting elevator $a^2$. Relay 84 is adapted to close a two-pole switch 90 for controlling the operation from battery 99 of reversible motor $c^1$ in one direction for shifting the rudder $a^3$ in one direction. Relay 85 closes a two-pole switch 91 for controlling the operation of motor $c^1$ in the reverse direction for reversely shifting rudder $a^3$. Relay 86 is adapted to control a single-pole switch 92 for rendering the motors $c$, $c^1$ operative, responsively to the control frequency to which circuit 69 is responsive, so that the motors will not be operated unless signals of predetermined frequencies, to which circuit 69 and one or more of the circuits 65, 66, 67 and 68 are responsive, are received. In other words, a plurality of predetermined audio-control frequencies must be simultaneously received by circuit G before the motors $c$, $c^1$ will be operated. A main battery switch 100 controls the supply of current to motors $c$, $c^1$ and the filaments of all of the radio tubes.

This exemplifies apparatus on the bomb for controlling the movements of the elevator and rudder to steer the bomb vertically and laterally after it is released from aircraft. Each of the angular movements of the rudder for deflection of the bomb to the right or left, and the movements of the elevator to negative or positive angles is controlled by a separate relay, and these relays are selectively operable by different audio-frequency control signals transmitted from one or more control points. The switch 88 is closed for the operation of motor $c$ for shifting the elevator to a negative angle and is controlled by an audio-frequency of 100 cycles per second, to which circuit 65 is responsive; the closing of switch 89 for the operation of the motor $c$ in the reverse direction to shift the elevator $a^2$ to a positive angle is controlled by an audio-frequency of 250 cycles per second to which circuit 66 is responsive; the closing of switch 90 for the operation of motor $c^1$ for shifting the rudder $a^3$ for deflection to the left is controlled by an audio-frequency of 1820 cycles per second to which circuit 67 is responsive; and the closing of switch 91 for the operation of motor $c^1$ for shifting the rudder $a^3$ for deflection to the right is controlled by an audio-frequency of 4550 cycles per second, to which circuit 68 is responsive. The extent of each movement of the control surfaces $a^2$, $a^3$ is determined by the duration of the signal. In the exemplification the invention illustrated in Fig. 3, the switch 92 is controlled by an audio-frequency of 675 cycles per second, to which the circuit 69 is responsive.

The invention contemplates transmission, as hereinafter set forth, to the radio responsive equipment on the bomb, of signals of two different frequencies for controlling each operation of either of the motors, so that a single signal from a source which is endeavoring to interfere with the control of the bomb will be insufficient to interfere with the control of the steering mechanism. For each operation of any of the relays for controlling the motor switches 88, 89, 90, and 91 the switch 92 must also be closed by an additional signal (675 cycles) so that the intended control of the bomb from aircraft maneuvering for that purpose involves the combination of two predetermined audio-frequencies to cause any operation of one of the motors, $c$, $c^1$ for directional change in the travel of the bomb.

The invention provides a method for the control of the signals for laterally steering the bomb from an airplane flying in the general direction of travel and over the bomb from which any lateral deflection necessary to direct the bomb toward the objective can be readily observed, and the control of the signals for varying the range or vertical course of the bomb from an airplane flying laterally of the bomb a sufficient distance so that the vertical deflection necessary to reach the objective can be observed.

Fig. 4 illustrates transmitting and control equipment for an airplane which may be used to produce signals for lateral control and for vertical control, so that when that airplane is maneuvered into a course for lateral deflection of the bomb the signals for that purpose will be controlled by the operator in that airplane and so that the same airplane when maneuvered for observation of the trajectory of the bomb can control the signals for vertical deflection via the airplane which controls the lateral deflection of the bomb. In other words, this equipment in one airplane includes that which is necessary for controlling the signals when the airplane is maneuvered for observation for either lateral or vertical deflection of the bomb. It also includes equipment through which it can receive signals from the airplane observing the trajectory for transmission of signals to the bomb for its vertical deflection.

The transmitting apparatus carried by the airplane in the form of the invention illustrated in Fig. 4 for control signals to a bomb equipped as illustrated in Fig. 3, comprises a modulating amplifier J, a short-wave transmitter O, oscillators $m$, $m^1$, $m^2$, $m^3$ and $m^4$ for producing different audio-frequencies corresponding to those to which the circuits 65, 66, 67, 68 and 69 are respectively responsive, a device $e$ for selectively controlling the modulating frequencies which are impressed on the transmitter O, and receiver $n$ and a transmitter $n^1$ for radio reception from and transmission to a second airplane provided with duplicate equipment.

The modulating amplifier J includes a multi-element amplifier tube $j^3$ (type 6F8), an audio-frequency coupling transformer $j^4$ and audio-power amplifier tubes $j^5$, $j^6$ (type 6L6) connected in push-pull between the input transformer $j^4$ and an output modulating transformer $j^1$. The control grids of amplifier tube $j^3$ are connected to adjustable potentiometers $j^2$ and $j^{20}$. The screen-grids of radio tubes $j^5$ and $j^6$ and the plate circuit of tube $j^3$ are connected to a terminal $j^7$ for supplying 250 volt positive potential. The plates of tube $j^3$ are connected in parallel to the primary of transformer $j^4$. The center tap of the primary of transformer $j^1$ is connected to a terminal $j^2$ of a source of 400 volt positive potential.

The transmitter O comprises a dipole transmitting antenna 10 which is resonant to the radio frequencies of the radio transmission and includes a coupling coil 11; an oscillator tank or plate coil 12; a tuning condenser 13 for coil 12; a multi-element push-pull transmitting radio tube 14 (similar to type 815 without a screen-grid, or a pair of type HY75 tubes); a radio frequency choke-coil 17 in a line $17^a$ between the output of modulating transformer $j^1$ and the coil 12; and an adjustable grid-circuit $o^1$ for the tube 14, including relatively adjustable copper tubing sections 16. Conductor $18^a$ is connected to a normally open switch $18^c$ which controls the supply of 45 volts minus potential from a terminal $18^d$ to the control-grids of tube 14. A resistor $18^b$ of approximately 5000 ohms is connected in a line between conductor $18^a$ and a terminal $18^e$ for 90 volts minus potential. A rectifier tube 28 is coupled through a condenser $28^a$ to the output terminal of the modulating transformer $j^1$ and a relay 29 is adapted to receive rectified current from tube 28 for the operation of switch $18^c$. A condenser $28^b$ is connected across the winding of relay 29 for smoothing out the rectified current impulses.

When the control device $e$ is shifted to close one of the switches associated therewith, alternating current from the secondary of the transformer $j^1$ will flow to rectifier tube 28, and rectified current will flow through the helix of relay 29 and close switch $18^c$, which will connect the control-grids of tube 14 to 45 volt negative potential. When switch $18^c$ is open the control grids of tube 14 are connected only to 90 volt negative potential through resistor $18^b$ rendering said tube inoperative by plate-current cut-off. When switch $18^c$ is closed, said grids will be connected to 45 volt negative potential, which constitutes the operating voltage for said tube.

A switch $n^5$ is provided for selectively connecting the output of the modulating amplifier J to the short-wave transmitter circuit O or to the aircraft transmitter $n^1$. When switch $n^5$ is in the position shown in full lines of Fig. 4, the signals selected by the control device $e$ will be transmitted through the modulating amplifier J to the transmitter O on the same airplane. When switch $n^5$ is shifted to its alternative position, signals selectively controlled by device $e$ will flow through modulating amplifier J and conductor $n^6$ into the aircraft transmitter $n^1$ for transmission of control signals to a second airplane.

Oscillator $m$ is adapted for the generation of 100 cycle audio-control signals; oscillator $m^1$ for the generation of 250 cycle audio-control signals; oscillator $m^2$ for the generation of 1820 cycle audio-control signals; oscillator $m^3$ for the generation of 4550 cycle audio-control signals, and oscillator $m^4$ for the generation of 675 cycle audio-control signals.

The control device $e$ is of the spring centered joy-stick type and is adapted to selectively connect the oscillators through potentiometer $j^2$ to one of the input grids of tube $j^3$. The stick of control device $e$ is selectively engageable with switches $e^2$, $e^3$, $e^4$, $e^5$ for respectively connecting the oscillators $m$, $m^1$, $m^2$, $m^3$ to conductor $e^1$. A two-pole switch $e^7$ is adapted to disconnect the stationary contacts of switches $e^2$, $e^3$ from oscillators $m$, $m^1$, when the airplane is not used for controlling the steering means on the bomb for vertical deflection. A two-pole switch $e^8$ is adapted to disconnect the stationary contacts of switches $e^4$ and $e^5$ from oscillators $m^2$, $m^3$ when the airplane is not used for transmitting signals for controlling the lateral deflection of the bomb. Oscillator $m^4$ is connected to oscillators $m$, $m^1$, $m^2$, $m^3$ so that when any of the switches of control device $e$ are closed the output from oscillator $m^4$ will flow through the circuit for the selected oscillator through the control device. The oscillator $m^4$ will superimpose its frequency upon the output of whichever of the remaining oscillators is selected at the control device $e$.

In carrying out the method of the invention with the bomb equipment illustrated in Fig. 3, and the airplane equipment illustrated in Fig. 4, two like-equipped airplanes (Fig. 2) S and T are used. The bomb is discharged from airplane S and initially travels in the direction in which that airplane is flying. An operator in that airplane, while it continues to travel in the same direction, can observe the lateral change or deflection necessary to direct the bomb toward the objective until it reaches its destination, and will manipulate the control device $e$ to steer the bomb laterally toward the objective. The airplane T flies in a course laterally distanced from the first airplane sufficiently for observation of the trajectory of the bomb in flight, and the operator in said airplane manipulates the control device $e$ for the control signals for the elevator $a^2$ to deflect or direct the bomb vertically toward the objective. If, after the bomb has been discharged, it appears that it will overshoot the objective, its range can be shortened by shifting the elevator $a^2$ to a negative angle to cause the bomb to dive more steeply.

If it appears that the range of the discharged bomb is somewhat short of the objective, the elevator $a^2$ can be shifted to a positive angle to increase the range of the bomb. By this method the range and lateral deflection of the bomb may be controlled by operators in two airplanes respectively flying in courses where the lateral and vertical deflections necessary for a hit can be observed and controlled throughout the course of the bomb. The movements of the rudder and elevator may be compounded by the operators in the two airplanes.

The method of carrying out the invention and the operation of the apparatus thus far described will be as follows: Two airplanes, S and T, each equipped with the apparatus shown in Fig. 4, are flown some distance apart toward the objective and at a sufficiently high altitude for observation of the discharged bomb. Assuming the bomb is discharged from airplane S (Fig. 2) while flying in a direction toward the objective and at a point judged to be that from which the bomb will travel to the objective, the pilot of said airplane momentarily flies horizontally in a direction which, if continued, would place his line of flight approximately over the objective. At this instant, the operator releases a bomb $a$ after which the pilot is immediately free to maneuver as conditions require, but he continues in the same general direction, endeavoring to remain approximately in the vertical plane which would include the objective and the point of release of the bomb. When the airplane S, traveling at high speed, has passed over the bomb, the operator in said airplane observes whether the lateral course of the bomb is approximately correct to reach the objective. In the meantime airplane T is flown in an approximately parallel course and endeavors to remain at approximately 90° to the position in the vertical plane in which the bomb falls, and an operator in said airplane observes whether the range of the bomb's trajectory is approximately correct to reach the objective. By this method one airplane will be maneuvered in a course from which an operator can observe the lateral deflection of the bomb necessary to reach the objective, and another airplane will be maneuvered where an operator therein can observe and determine the vertical deflection necessary to direct the bomb to the objective, practically until the bomb has completed its travel.

While airplane S is used for dropping and controlling the lateral course of bomb $a$, the switch $e^8$ in said airplane is closed, switch $e^7$ in said airplane is open, and switch $n^5$ in said airplane is in the position shown in Fig. 4. While airplane T is used for observing and controlling the range of the bomb, the switch $e^7$ in said airplane is closed, switch $e^8$ in said airplane is open, and switch $n^5$ in said airplane is engaged with the terminal of conductor $n^6$. The switch 100 is closed when the bomb is released so that the filaments of radio tubes 43, 56, 75, 76, 77, 78 and 79 will be connected to the 6 volt battery 99.

Assuming the direction of travel of the bomb, as viewed by the operator in airplane S, is to the right of the path required to reach the objective, he will move the lever of device $e$ to close the switch $e^4$, which will connect the output of oscillators $m^2$ and $m^4$ via conductor $e^1$ and potentiometer $j^2$ to one grid of tube $j^3$ where it is amplified and passed from the plate of said tube to the primary winding of audio-coupling transformer $j^4$. This produces a similar but augmented voltage across its secondary terminals which are connected to the control grids of amplifier tubes $j^5$, $j^6$. The output of tubes $j^5$, $j^6$ is connected to the primary of modulation transformer $j^1$, the secondary of which carries the plate current from terminal $j^2$ (400 volt potential), via switch $n^5$, conductor $17^a$, choke-coil 17, tank coil 12, to the plates of tube 14 of the grid stabilized short-wave transmitter O. The plate potential of 400 volts applied to the plates of circuit O is thus increased and diminished sinusoidally in accordance with the 1820 cycle frequency of oscillator $m^2$ and the 675 cycle frequency of oscillator $m^4$. A small part of the amplified control signal power passes through the blocking condenser $26^a$, which is connected to the output terminal of transformer $j^1$, into the rectifier tube 28 which then supplies direct current for the actuation of relay 29. Until relay 29 is actuated the 90 volt negative potential applied to the control grids of tube 14 from terminal $18^e$ via via resistor $18^b$, conductor $18^a$, grid-circuit $o^1$, has prevented the operation of the short-wave oscillator tube 14 by plate current cut-off. As soon as relay 29 is actuated by a control signal, switch $18^c$ is closed to apply the optimum operating grid potential (45 volts negative) from terminal $18^d$ to the control-grids of short-wave tube 14, producing control-signal-modulated high frequency energy in the tank coil 12, which is transferred by magnetic coupling to coil 11 and radiated into space by the resonant half-wave dipole antenna 10.

The half-wave dipole antenna, composed of rod 40, coil 41, and the body of bomb $a$ (Fig. 3) is strongly resonant to the short-wave energy radiated from the transmitter antenna 10 of airplane S, and therefore responds to the transmitted signals and transfers this energy by means of magnetic coupling from coil 41 to coil 42 of radio responsive apparatus H where, by superregenerative detector action, the control signals are detected and passed through the low-pass filters 47, 50 and 48, 51 through audio-coupling transformer 55 into tube 56 where said signals are greatly amplified and pass into the frequency responsive circuits 65, 66, 67, 68, and 69. Since only audio-control signals having frequencies of 1820 cycles and 675 cycles are present, only circuits 67 and 69 respond, so that the signals will pass through condensers 74 to the control grids of tubes 77, 79. While tubes 77 and 79 are biased nearly to plate current cut-off by the negative potential of 9 volts applied from bias battery 61 through conductor 80 and grid resistors 81 to the control-grids of said tubes, the presence of large amplitude audio-signals also applied to said control-grids causes these tubes to draw considerable plate current during the positive half of the audio-control signals. This increased plate current flowing through the current sensitive relays 84 and 86, smoothed out by condensers 115, causes the relays 84 and 86 to close switches 90 and 92, respectively. 6 volt current flows from battery 99 through switch 100, fuse 95, conductor 116, closed switch 92, conductor 117, one pole of switch 90, the armature of motor $c^1$; the other pole of switch 90, the field winding 118 of motor $c^1$, to the ground. Motor $c^1$ will then be operated as long as the operator in airplane S holds switch $e^4$ closed. In practice this may be done by a succession of short periods until the motor $c^1$ has shifted the rudder $a^3$ to steer the bomb laterally to the right. At the end of the desired angular movement of the rudder the operator will release control device $e$ so the signal transmission will cease and the motor $c^1$ will stop. Motors $c$, $c^1$ have armatures of low inertia enabling them to start and stop quickly and shift the rudders with non-reversible gear trains, such as worm drives, for preventing the movement of the rudder or elevator by air force.

A characteristic of this apparatus is that it requires a signal of one predetermined frequency (675 cycles) such as the output of oscillator $m^4$, to cause the operation of the switch 92 and a signal of a different predetermined frequency (1820 cycles) to cause the closing of switch 90 for the aforesaid operation of motor $c^1$. In consequence, only simultaneous signals of these two predetermined frequencies can cause the operation of motor $c^1$ for shifting the rudder $a^3$ in the direction described. When these signals are discontinued at the control device $e$, relays 84 and 86 will be deenergized and switches 90 and 92 will be opened. In this operation only relays 84 and 86 will be actuated because circuit 69 is responsive only to 675 cycles and circuit 67 is responsive only to 1820 cycles, because the tuned circuits consisting of coils 71 and condensers 72 in said circuits 67 and 69, respectively, resonate only in the presence of these frequencies.

In the event that bomb $a$ is moving to the left of the course desired, the operator in airplane S will shift the control stick of device $e$ into position to close switch $e^5$ which will connect oscillators $m^3$ and $m^4$ for the transmission of signals of 4550 cycles from oscillator $m^3$, and of 675 cycles for oscillator $m^4$, for controlling the motor $c^1$ to operate in the reverse direction. Circuits 68 and 69 will be responsive to these frequencies and the signals from control device $e$ in the airplane S to the audio-responsive apparatus G in the bomb will be transmitted to said apparatus in the same manner described in connection with the control of the movement of the rudder to the left. These controlled signals will actuate the tubes 78, 79 and relays 85, 86 to close switches 91 and 92. Switch 92 will then close a circuit from battery 99 through switch 100, fuse 95, conductor 116, switch 92, conductor 117, one pole of switch 91, the armature of motor $c^1$, the other pole of switch 91, and the field winding 118 of motor $c^1$ to the ground. The flow of current through this circuit will operate the motor $c^1$ in the reverse direction to that previously described and will shift the rudder $a^3$ to the right to correspondingly correct the course of the bomb laterally.

In the event that the operator in airplane T observing the trajectory of the bomb determines that a change in said trajectory is necessary, he will operate the control device $e$ in his airplane for causing the elevator $a^2$ to be shifted for modification of the trajectory to the extent desired. In the event that the last named operator observes that the bomb is going to overshoot its objective, he will move the lever of the control device $e$ in his airplane to close the switch $e^2$. When switch $e^2$ is closed, the output of 100 cycle oscillator $m$ and the output of 675 cycle oscillator $m^4$ in series pass through the audio modulating amplifier J, the output of which is connected through switch $n^5$ to the transmitter $n^1$ and antenna $n^2$ on airplane T. From the antenna $n^2$ of airplane T the signals are transmitted to the corresponding antenna $n^2$ on airplane S. These signals received by airplane S pass from antenna $n^2$ through the aircraft receiver $n$, conductor $n^3$, potentiometer $j^{20}$ to one input grid of the tube $j^3$ of the modulating amplifier J, the output of which functions to modulate the short-wave radio energy from the transmitting antenna 10 as before described in connection with the lateral control signals. These control signals are transmitted to the receiving apparatus H and G of the bomb, but being modulated with 100 cycle and 675 cycle audio-control signals, will excite only circuits 65 and 69 which are responsive to said frequencies. As a result tubes 75 and 79 will be actuated to operate relays 82 and 86 to close switches 88 and 92, respectively. Current from the 6 volt battery 99 then flows through conductors 116, switch 92, conductor 117, one pole of switch 88, the armature of motor $c$, the other pole of switch 88, the field coil 119 of motor $c$ to ground. Motor $c$ will then be operated in one direction to shift the elevator to a negative angle to shorten its trajectory toward the objective, until the operator in airplane T opens the switch $e^2$.

If the operator in airplane T observes that the range of the trajectory of the bomb is short of the objective he will selectively shift the device $e$ to close switch $e^3$. When said switch $e^3$ is closed the output of 250 cycle oscillator $m^1$ and the output of 675 cycle oscillator $m^4$ in series, passes through the audio modulator J, the output of which is connected through switch $n^5$ to the transmitter $n^1$ and antenna $n^2$. From the antenna $n^2$ the signals are transmitted to, and received by the corresponding antenna $n^2$ and receiver $n$ on airplane S. These signals are transmitted, as before described in connection with the other vertical control-signals, to the receiving equipment H, G of the bomb, but being modulated with 250 cycle and 675 cycle audio-control signals will excite only circuits 66 and 69, which are responsive to said frequencies. Circuits 66 and 69 will actuate tubes 76 and 79 to operate relays 83 and 86 to close switches 89 and 92, respectively. Current from 6 volt battery 99 then flows through conductor 116, switch 92, conductor 117, and one pole of switch 89, the armature of motor c, the other pole of switch 89, the field coil 119 of motor c to ground. This will cause the reversible motor c to be operated to shift the elevator to a positive angle for extending its trajectory. All of these variations in the deflection of the bomb may be continued as long as the bomb is visible and until it reaches the end of its flight.

The apparatus illustrated in Figs. 3 and 4 exemplifies a control system for a dirigible bomb in which two control signals must be simultaneously present in the receiving apparatus for controlling the movement of either the elevator or the rudder.

In some instances it may be desired to use single signals for controlling the movements of either the rudder or the elevator, and receiving apparatus in the bomb for such signals is illustrated in Fig. 7. In some instances it may be preferable to equip one airplane for the transmission of signals for the control of the rudder only and a second airplane with apparatus for the signals for controlling the elevator from a second airplane, via the control equipment in the first airplane. Such apparatus is illustrated in Figs. 5 and 6. Fig. 5 illustrates the transmitting apparatus in the airplane which is flown over the bomb and indicated by $S^1$. Fig. 6 illustrates the apparatus used in an airplane for control of the elevator and is designated $T^1$.

The equipment in airplane $S^1$ (Fig. 5), which is used to discharge bombs, comprises a one-half wave-length dipole transmitting antenna $10^c$ which is resonant to the radio frequency of the transmission and includes a coupling coil $11^c$; a short-wave transmitter $O^1$; oscillators $m^{30}$ and $m^{40}$ for producing different audio-frequencies corresponding to those to which circuits 67 and 68 in the bomb equipment are respectively responsive; an aircraft receiver $n^{10}$ with a receiving antenna $n^{11}$; and a control device $e^{10}$ adapted to selectively close switches $e^{11}$ and $e^{12}$, connecting the oscillators $m^{30}$ and $m^{40}$, respectively, through a conductor $e^{13}$ to the grids of radio tube $14^c$. The short-wave transmitter $O^1$ comprises an oscillator tank coil $12^c$, a multi-element push-pull transmitting radio tube $14^c$ (type 815); a tuning condenser $13^c$; an adjustable grid-circuit $15^c$ with relatively adjustable copper tubular sections $16^c$; a radio frequency choke-coil $17^c$ in a line between 400 volt terminal $19^c$ and the coil $12^c$; and a conductor $18^d$ between a supply terminal for 250 volt current and the screen-grids of tube $14^c$. A terminal $16^b$ supplies minus 90 volts potential to an adjustable grid-circuit $15^c$ through parallel conductors $21^c$, $22^c$ in each of which a 1000 ohm resistor $23^c$ and a 5000 ohm resistor $23^d$ is included. Conductor $e^{13}$ connects the stick of control device $e^{10}$ to conductor $21^c$ between the resistors $23^c$ and $23^d$. The minus 90 volt potential applied through resistors $23^d$ and $23^c$ in branches $21^c$, $22^c$ to grids of tube $14^c$, biases said tube to plate-current cut-off, so that said tube is rendered inoperative until the control device $e^{10}$ is shifted to connect minus 35 volt potential from terminal $31^c$ and one of the oscillators $m^{30}$ or $m^{40}$ to the grid-circuit for tube $14^c$. A transformer $26^c$ is connected to receiver $n^{10}$ and its secondary coil is in a relay and rectifier circuit $27^c$ which includes a switch $30^c$ between a minus 35 volt potential terminal $31^c$ and conductor $22^c$; a rectifier tube $28^c$ and a relay $29^c$, which are connected in series across the output terminals of the secondary of transformer $26^c$. The relay $29^c$ is adapted to control switch $30^c$ for supplying minus 35 volt potential from terminal $31^c$ through the secondary of transformer $26^c$ to conductor $22^c$, for rendering tube $14^c$ operative and modulating its output with audio-frequency controlled signals from receiver $n^{10}$.

The airplane $T^1$, which is used to fly in a course for observation of the trajectory of the bomb, is equipped with an aircraft transmitter 33, which includes an antenna 34; a 100 cycle oscillator $m^{50}$; a 250 cycle oscillator $m^{60}$; and switches $e^{21}$, $e^{22}$ controlled by control device $e^{20}$ for alternately connecting said oscillators to transmitter 33. The oscillators are operated by current from any suitable source, and are adapted for producing different audio-frequencies to which circuits 65 and 66 in the bomb (Fig. 7) are responsive, for controlling the up and down movement, respectively, of the elevator $a^2$.

Fig. 7 illustrates apparatus in the bomb a for controlling its steering means from the apparatus illustrated in Figs. 5 and 6. The apparatus in the bomb is, and operates in a manner, similar to the apparatus in Fig. 2, except that each movement of the steering means is controlled by a single audio-control frequency. This apparatus is responsive to the control device $e^{10}$ in airplane $S^1$ for controlling the movements of the rudder, and to the device $e^{20}$ on airplane $T^1$ for controlling the movements of the elevator.

The apparatus carried by the bomb and illustrated in Fig. 7 includes in all respects the equipment shown in Fig. 3, except that the circuit 69 which is responsive to the 675 cycles, radio tube 79, relay 86, and switch 92 are omitted.

The operation of the apparatus illustrated in Figs. 5, 6, and 7 of the drawings will be as follows: Assuming the airplanes $S^1$ and $T^1$ are being maneuvered for respectively observing the lateral direction and trajectory of the discharged bomb, and it is desired to deflect the bomb laterally to the left, the operator in airplane $S^1$ will shift control device $e^{10}$ to close switch $e^{11}$, whereupon a signal of 1820 cycles will be transmitted through switch $e^{11}$, conductor $e^{13}$, to modulate the short-wave transmitter $O^1$ and radiate a control signal from antenna $10^c$ to the radio responsive apparatus H and G (Fig. 7) on the bomb. Circuit 67 will be responsive to this control frequency and tube 77 will cause relay 84 to be actuated to close switch 90. Motor $c^1$ will then be operated in the correct direction to shift the rudder $e^3$ to deflect the bomb to the left according to the extent desired, which is determined by the duration of the signal. If deflection of the bomb to the right is desired according to the observation of the operator in airplane $S^1$, control device $e^{10}$ will be shifted to close switch $e^{12}$ which will produce a signal of 4550 cycles which will be transmitted as before described to the receiving apparatus in the bomb. Circuit 68 alone will be responsive to this frequency and will cause the actuation of tube 78 for operating relay 85 to close switch 91 for the operation of motor $c^1$ in the correct direction for shifting the rudder for deflection of the bomb to the right. In the event that the operator in the airplane $T^1$, who is traveling for observation of the trajectory of the bomb, determines that the bomb should be deflected downwardly, he will shift the stick of control device $e^{20}$ to close switch $e^{21}$ whereupon a control signal of 100 cycles will be transmitted through transmitter 33, antenna 34 to the receiver $n^{10}$ on airplane $S^1$. Signal voltage from the secondary of transformer $26^c$ flows through the winding of relay $29^c$ and rectifier tube $28^c$ where it is rectified. This current energizes the helix of relay $29^c$ and closes switch $30^c$. When said switch is closed the negative potential of 35 volts from terminal $31^c$ flows through the secondary of transformer $26^c$ and together with the control signal flows through conductor $27^c$, switch $30^c$, conductor $22^c$, resistor $23^c$ to the control grids of tube $14^c$. The signal will then follow the same course as previously described to the receiving equipment on the bomb. Circuit 65 being responsive only to said frequency (100 cycles) will cause the actuation of tube 75 for operating the relay 82 to close switch 88. The motor $c$ will then be operated in the correct direction for shifting the elevator to a negative angle to deflect the bomb downwardly. If the operator in airplane $T^1$ desires to extend the range of the bomb, he will shift the stick of control device $e^{20}$ to close switch $e^{22}$ for the transmission of a signal of 250 cycles in the same manner as previously described to the radio receiving apparatus in the bomb. Circuit 66, which is responsive only to this frequency, will then cause tube 76 to be actuated for the operation of relay 83 to close switch 89. The motor $c$ will then be operated in the correct direction to shift the elevator $a^2$ to a positive angle for extending the range of the bomb's trajectory. This exemplifies a method and apparatus for directionally controlling a bomb for vertical and lateral deflection in which one airplane is equipped with radio transmitting apparatus and means for selectively controlling the transmission of single signals for the control of the rudder, and a second airplane is equipped only with means for selectively controlling the elevator by means of single signals which are transmitted to the first airplane and then transmitted to the bomb.

For improving the visibility of the discharged bomb to the operators in the airplanes from a distance of several miles, a device, illustrated in Fig. 9, is provided at the rear of the bomb for producing a smoke-trail in the course of the travel of the bomb which will be clearly visible to the operators at the control devices for steering the bomb. This device comprises a cylindrical housing 102 which is fixed to the housing $c^4$ for the control apparatus on the bomb and the cartridge-shell 106 which is screwed into housing 102. A detonating cap 107, a primer charge 108, and a smoke pellet or candle 109, which may consist, for example, of a mixture of hexaclorethene, powdered zinc and zinc oxide, and is provided with longitudinal vents 110 for the escape of smoke produced by the burning of the candle. A detonating plunger 104 is slidably mounted in a sleeve 111, and is shiftable by a spring 105 to fire the cap 107. A pin 101 is slidable vertically in the housing 102, extends through a hole at the inner end of the plunger 104, and is adapted to hold the plunger in a cocked position. This pin is also adapted to hold the switch 100 open so that six volt current will not be supplied to the filaments of tubes 43, 56, 75, 76, 77, 78 and 79 and the motors $c$, $c^1$ until it is closed by an operator. The pin 101 may be automatically withdrawn from housing 102 to close switch 100 and release the detonating plunger 104, by a cable 114 which is attached to said pin and to a fixed part of the airplane from which the bomb is discharged. As the bomb falls away from the airplane, the cable will automatically withdraw the pin, close the switch 100, and permit spring 105 to impel the plunger 104 against the cap 107 to ignite the primer charge 108 which in turn will ignite the pellet or candle 109 to produce smoke which will pass through vents 110 and form a smoke-trail as the bomb travels to its objective.

Each bombardier usually has only to introduce small corrections in the downward course of the bomb to keep it headed toward the objective in the plane of his sight and since these two planes of sight are approximately at right angles to each other the problem of depth perception is completely eliminated, and the accuracy of bombing operations greatly enhanced.

The invention makes it very difficult, or practically impossible, for the enemy to gain control of and deflect the bomb from its objective because the radio control wave used is in the short or ultra-short wave region where it is difficult to locate even with the necessary special equipment involved; the radio control wave is radiated only during the movements when control signals are being transmitted, thus decreasing the possibility of their being located by enemy receivers, and in the unlikely event that the enemy discovers the required wave-length to control the bomb, it would still be necessary for them to locate and simultaneously transmit the correct pair of audiofrequencies. If the enemy generates a barrage of short-wave interference of sufficient intensity to overpower the control signals as the bomb approaches its objective, depending on the type of interference, several pairs of relays are likely to be actuated, which will cause the fuse 95 to blow out and a change in the course of the bomb will be averted. This same effect can be obtained at any time the bombardier detects excessive enemy interference in the monitor of his receiver, by closing a four-pole switch $e9$ (Fig. 4) which will cause all five control signals to be radiated simultaneously. Due to the inherent automatic volume control action of the superregenerative type detector H interference of short duration will merely decrease the sensitivity of the detector momentarily, its sensitivity being restored as soon as the interference drops below the level of the control signals. The enemy has only a very short time during the fall of the bomb to experimentally locate the required control frequencies, and each bomb can have a number stenciled on it corresponding to the audio-control frequency required to close switch 92 to which frequency the master oscillator $m^4$ (675 cycle) may be set.

The invention provides for transmitting the control signals from two airplanes through a short-wave transmitter O in one of the airplanes. The purpose of this is to insure reception of all control signals at the bomb which will be of equal intensity. The radio-responsive apparatus H is of such a character that radio signals of widely different intensity producing audio output are detected and produce audio output of substantially uniform intensity. If radio signals from two different sources or airplanes are transmitted to the bomb the received intensity will result in the stronger of the two producing audio output of normal intensity, but the weaker will produce proportionately weaker audio output and may not operate the predetermined frequency responsive circuit for which the signal is intended. If radio control signals were received at the bomb from two separate sources, unless they were of exactly the same radio frequency, they would heterodyne with each other and produce audio tones that might actuate one or more of the audio frequency responsive circuits, which is not intended, interfering with the directional control of the bomb.

While the invention has been described in connection with a bomb discharged from aircraft, it will be understood that dirigible missiles or projectiles of any type may be directionally controlled. The values of the elements described for use in the transmitting and receiving equipment have been stated by way of example, and may be varied in carrying out the invention.

The method directionally controls a bomb vertically and laterally from aircraft for accuracy in delivering it to the desired objective. The invention also exemplifies means by which the control of the direction of the bomb can be controlled from aircraft for steering the bomb toward the objective substantially until its flight has been completed. The invention also exemplifies apparatus in which signals of different audio frequencies are used to severally control the necessary movements of the elevator and rudder. The invention also exemplifies apparatus on the bomb which is highly responsive to the signals from aircraft. The invention also exemplifies means for improving the visibility of the bomb in flight for observation of its course.

The invention is not to be understood as restricted to the details set forth since these may be modified within the scope of the appended claims without departing from the spirit and scope of the invention.

Having thus described the invention, what I claim as new and desire to claim by Letters Patent is:

1. Apparatus for directionally controlling the travel in the air of a discharged bomb provided with steering means for laterally and vertically controlling its direction of travel and radio and audio means responsive to different predetermined signals for controlling the steering means for each change in direction of travel laterally and of its trajectory comprising, an airplane equipped with means for transmitting modulated radio signals to the bomb for steering the bomb laterally and varying its trajectory, means on the same airplane for transmitting and controlling predetermined radio signals to the bomb for steering the bomb laterally while the same airplane is flying at an elevation higher than the bomb where its direction laterally is visible, and a radio receiver, and a second airplane equipped with means for transmitting modulated radio control signals to the receiver on the first airplane for controlling the transmission of radio signals from the first airplane to the bomb for varying its trajectory.

2. Apparatus for directionally controlling the travel in the air of a discharged bomb provided with steering means for laterally and vertically controlling its direction of travel and radio and audio means responsive to signals of different predetermined frequencies for controlling the steering means for each change in direction of travel laterally and of its trajectory comprising, an airplane equipped with means for transmitting modulated radio signals to the bomb of the predetermined frequencies for steering the bomb laterally and varying its trajectory, means on the same airplane for controlling radio signals to the bomb of the predetermined frequencies for steering the bomb laterally while the same airplane is flying at an elevation higher than the bomb where its direction laterally is visible equipped with a radio receiver for radio signals, and a second airplane equipped with means for transmitting modulated radio control signals to the receiver on the first airplane for controlling the transmission to the bomb of modulated radio signals with predetermined frequencies for varying the trajectory of the bomb from the first airplane while the second airplane is flying in laterally offset relation from the path of travel of the bomb where its trajectory is visible.

3. In apparatus for controlling the direction through the air of a dirigible bomb provided with steering means and radio responsive means for controlling the steering means, the combination of a short wave transmitter for signals to the radio responsive means on the bomb including a modulating amplifier, a dual input for the modulating amplifier, oscillators for producing modulating signals, means for selectively connecting the oscillators to one input of the modulating amplifier, a transmitter located at a remote station, a modulating amplifier connected to said remote transmitter, oscillators adapted to be selectively connected to the remote transmitter, and a radio receiver equipped to receive the modulated signals from the remotely located transmitter and having its output connected to the other input of the amplifier with the first mentioned transmitter.

4. That improvement in directionally controlling the travel in the air of a discharged bomb provided with modulated radio signal responsive steering means for laterally and vertically controlling its direction by selective transmission of modulated radio signals from a pair of airplanes which comprises: flying one of the airplanes in laterally offset relation to the bomb where its trajectory is visible, flying the other airplane at an elevation above the bomb where its direction laterally is visible, steering the bomb to vary its trajectory by radio and audio signals controlled from the airplane flying laterally of the bomb, and steering the bomb laterally by radio and audio signals controlled from the airplane flying in the elevated position.

5. That improvement in directionally controlling the travel in the air of a discharged bomb provided with radio signal responsive steering means for laterally and vertically controlling its direction by selective transmission of modulated radio signals from a pair of airplanes which comprises: flying one of the airplanes in laterally offset relation to the bomb where its trajectory is visible, flying the other airplane at an elevation above the bomb where its direction laterally is visible, steering the bomb to vary its trajectory by modulated radio signals controlled from the airplane flying laterally of the bomb and transmitted via the other airplane to the bomb, and steering the bomb laterally by modulated radio signals controlled and transmitted from the airplane flying above the bomb.

MURRAY G. CLAY.